United States Patent
Kohda

(10) Patent No.: US 10,609,498 B2
(45) Date of Patent: Mar. 31, 2020

(54) DISPLAY SYSTEM COMPARING SOURCE AND OUTPUT OF MOBILE AUDIO DEVICES

(71) Applicant: Radius Co., Ltd, Chuo-ku, Tokyo (JP)

(72) Inventor: Susumu Kohda, Tokyo (JP)

(73) Assignee: Radius Co., Ltd., Chuo-ku, Tokyo (JP)

( * ) Notice: Subject to any disclaimer, the term of this patent is extended or adjusted under 35 U.S.C. 154(b) by 91 days.

(21) Appl. No.: 15/590,016

(22) Filed: May 9, 2017

(65) Prior Publication Data
US 2017/0245080 A1    Aug. 24, 2017

Related U.S. Application Data

(63) Continuation of application No. PCT/JP2015/085203, filed on Dec. 16, 2015.

(30) Foreign Application Priority Data

Dec. 19, 2014    (JP) ................................ 2014-006746

(51) Int. Cl.
G06F 9/48        (2006.01)
H04R 29/00       (2006.01)
(Continued)

(52) U.S. Cl.
CPC ............ H04R 29/008 (2013.01); A63J 17/00 (2013.01); G06F 3/162 (2013.01); G06F 3/165 (2013.01);
(Continued)

(58) Field of Classification Search
CPC ........ H04R 29/008; A63J 17/00; G06F 3/162; G06F 3/165; G06F 17/30058;
(Continued)

(56) References Cited

U.S. PATENT DOCUMENTS

2005/0248474 A1* 11/2005 Wiser ............... G11B 20/10527
                                                           341/50
2006/0136080 A1*  6/2006 Williams .................. H04S 7/40
                                                            700/94
(Continued)

FOREIGN PATENT DOCUMENTS

JP            3185412 U       7/2013

OTHER PUBLICATIONS

Audirvana, "Auirvana Plus 2.0 User Manual", Oct. 21, 2014 [online], [retrieved on Oct. 17, 2018]. Retrieved from the Internet: <https://web.archive.org/web/20140925073951/http://audirvana.com:80/delivery/Audirvana%20Plus%20User%20Manual.pdf>, 40 pages. (Year: 2014).*

(Continued)

*Primary Examiner* — Jennifer N To
*Assistant Examiner* — KC Chen
(74) *Attorney, Agent, or Firm* — Yokoi & Co., U.S.A.; Toshiyuki Yokoi

(57) ABSTRACT

The object is to provide a display system of mobile audio devices which enables comparative display between frequency range of audio source read externally and memorize by the main body of the mobile audio devices and frequency range replayed by the main body of the mobile audio devices.

The display system of audio devices comprises the audio source file 18 memorizing outer audio source data, the replay unit 14 of audio source data of the audio source file 18, the device data memory 16 of data of replay devices, the controller 15 controlling among circuits, the sampling rate output 21 of audio source data of said audio source file 18, the replay sampling rate output 23 outputting said replay sampling rates, the audio source output display part 12

(Continued)

displaying said sampling rate output 21, and the replay output display part 13 displaying said replay sampling rate output 23.

1 Claim, 2 Drawing Sheets

(51) Int. Cl.
*G10L 21/14* (2013.01)
*A63J 17/00* (2006.01)
*G06F 3/16* (2006.01)
*G06T 13/80* (2011.01)
*G06F 16/44* (2019.01)
*G06F 16/64* (2019.01)
*G10L 19/00* (2013.01)

(52) U.S. Cl.
CPC .............. *G06T 13/80* (2013.01); *G10L 21/14* (2013.01); *G06F 16/44* (2019.01); *G06F 16/64* (2019.01); *G10L 19/00* (2013.01)

(58) Field of Classification Search
CPC ... G06F 17/30775; G06T 13/80; G10L 21/14; G10L 19/00
See application file for complete search history.

(56) References Cited

U.S. PATENT DOCUMENTS

| | | | |
|---|---|---|---|
| 2011/0015766 A1* | 1/2011 | Gehring | G10H 1/0066 700/94 |
| 2013/0208927 A1* | 8/2013 | Wang | H04R 1/1041 381/306 |
| 2014/0100010 A1* | 4/2014 | Lee | G09B 15/00 463/7 |
| 2014/0177854 A1* | 6/2014 | Morton | H04R 3/04 381/59 |

OTHER PUBLICATIONS

International Search Report for PCT/JP2015/085203 dated Mar. 1, 2016.
PCT written opinion dated Mar. 1, 2016.
Atsushi Takahashi, iTunes 11 Taio!! Digital Jidai no iTunes 'Koonshitsuka' Keikaku, Mac People, vol. 19, No. 2, Dec. 27, 2012, p. 85.
Atsushi Takahashi, High-res Saisei Sofuto ga Hofu na Mac PC (Mac) de High-res o Tanoshimu, AV Review November issue, vol. 30, Mitsumasa WADA Ongen Publishing Co., Ltd., Nov. 25, 2013, p. 65.
Nobuo Jinbo, MP3 o Tanoshimu Tameno Teiban Sofuto, Asahi Pasokon, No. 257, Dec. 15, 1999, p. 136.

* cited by examiner

US 10,609,498 B2

DISPLAY SYSTEM COMPARING SOURCE AND OUTPUT OF MOBILE AUDIO DEVICES

CROSS-REFERENCES TO RELATED APPLICATIONS

This Application claims the benefit of priority and is a Continuation application of the prior International Patent Application No. PCT/JP2015/085203, with an international filing date of Dec. 16, 2015, which designated the United States, and is related to the Japanese Utility Model Application No. 2014-006746, filed Dec. 19, 2014, the entire disclosures of all applications are expressly incorporated by reference in their entirety herein.

BACKGROUND OF THE INVENTION

1. Field of the Invention

This invention relates to a display system of mobile audio devices which enables comparative displays between a frequency range of audio sources read from outside and memorized in the main body of mobile audio devices and a frequency range replayed at the main body of the mobile audio device.

2. Description of Related Art

In accordance with improvement of functions in mobile audio replay devices, replay devices with higher sound quality have been requested increasingly. As results, as for audio sources of music, devices which memorize higher sampling frequencies than CD (sampling frequency 44.1 kHz) such as 96 kHz or 192 kHz with high sound quality begin to be sold.

However, although an audio source is with a high sound quality, it is unknown if an audio replay device can be replayed with such sound quality as making the best use of the sound source.

Conventionally, although an earphone is connected to a mobile audio replay device by cord, devices have been known that multiple LEDs are equipped on the way of the cord and these LEDs turn on by light emitting brightness, plain color, color, fixation, blinking, revolving lantern, water-flow simulation dynamic state etc. (for example, patent reference 1).

[Patent reference 1] Registration of utility model No. 3185412 official bulletin

GENERAL DESCRIPTION OF THE INVENTION

Brief Summary of the Invention

In the earphones shown in Patent Reference 1, although changes in sound volume and tempo etc. can be known, it cannot be known if the replay device enables to replay the frequency range in maximum.

This invention intends to provide the display system of mobile audio devices which enables comparative displays between frequency range of audio source read from outside and memorized in the main body of mobile audio device and the frequency range replayed by the main body of this mobile audio device.

The display system of mobile audio devices in the invention equips an audio source file 18 reading outer audio source data and memorizing them, a replay unit 14 replaying audio source data of the audio source file 18, a controller 15 controlling reading and outputting of audio source data and those of device data, a sampling rate output 21 outputting a sample rate of the audio source data of said audio-source file 18, a replay sampling rate output 23 outputting a replay sampling rate based on a replay output from said controller 15 to the replay unit 14, an audio-source output display part 12 displaying a sampling rate of said sampling rate output 21, and a replay output display part 13 displaying a sampling rate of said replay sampling rate output 23.

The display system in the invention also equips a file format output 20 outputting audio-source file data of the audio-source file 18 and a device data output 22 outputting device data of the device data memory 16, and displays file format names of said file format output 20 at a file name display part 24 of an audio source output display part 12 and displays device data of said device data output 22 at a replay device name display part 27 of the replay output display part 13.

The audio-source output display part 12 includes the numerical value display part 25 displaying by numerical values from the sampling rate output 21 and the bar graph display part 26 displaying by bar graphs, and the replay output display part 13 includes the numerical-value display part 28 displaying by numerical values from the replay sampling rate output 23 and the bar-graph display part 29 displaying by bar graphs.

According to the invention in claim 1, because a display system of mobile audio devices comprises an audio-source file 18 reading outer audio-source data and memorizing, a replay unit 14 replaying audio-source data of the audio-source file 18, a device data memory 16 memorizing data of replay devices, a controller 15 controlling reading and output of audio-source data and reading and output of device data, a sampling rate output 21 outputting sampling rates of audio-source data of said audio-source file 18, a replay sampling rate output 23 outputting replay sampling rates based on replay output from said controller 15 to the replay unit 14, an audio-source output display part 12 displaying sampling rate of said sampling rate output 21, and a replay output display part 13 displaying sampling rates of said replay sampling rate output 23, for example, despite 96 kHz of audio-source data memorized in the audio-source file 18, it can be known at first glance that the replay is made with 48 kHz. It demonstrates to be easily recognizable that the audio source memorized isn't replayed sufficiently by a main body of a mobile audio device 10 in use.

In addition, when the displays in the audio-source output display part 12 and replay output display part 13 are identical, it is easily recognizable that the main body of the mobile audio device 10 replays it as making sufficient use of the audio source.

According to the invention in claim 2, because the display system of mobile audio devices comprises a file format output 20 outputting file data of audio-source data of the audio-source file 18 and a device data output 22 outputting device data of the device data memory 16 and the file format names of said file format output 20 are displayed at a file name display part 24 of the audio-source output display part 12 and device data of said device data output 22 are displayed at a replay device name display part 27, file format names of audio sources and device data of said device data output 22 can be displayed.

According to the invention in claim 3, because the audio-source output display part 12 comprises a numerical-value display part 25 displaying by numerical values from the sampling rate output 21 and a bar graph display part 26 displaying by bar graphs, and the replay output display part 13 comprises a numerical-value display part 28 by numerical values from the replay sampling rate output 23 and a bar-graph display part 29 displaying by bar graphs, comparisons between digital display and analogue display can be made clearly at first glance.

DETAILED DESCRIPTION OF THE INVENTION

Figure 1:
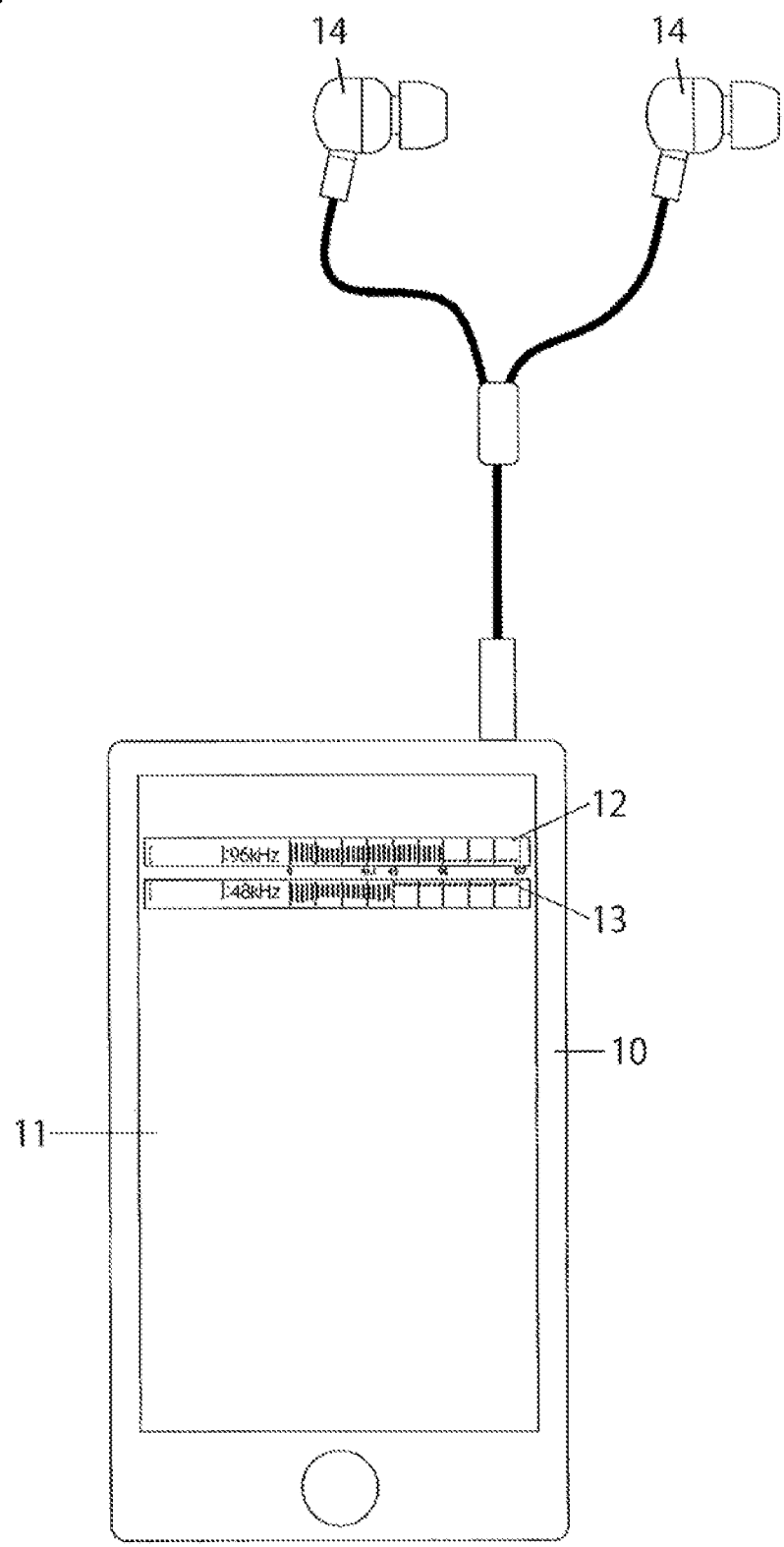
FIG. 1 is a front elevational view showing an embodiment of a display system of mobile audio devices in the present invention.

The display system of mobile audio devices in the present invention comprises the audio-source file 18 reading outer audio-source data and memorizing them, the replay unit 14 replaying audio-source data of the audio-source file 18, the device data memory 16 memorizing data of replay devices, the controller 15 controlling reading and outputting of audio source data and reading and outputting of device data, the sampling rate output 21 outputting sampling rates of audio source data of said audio source file 18, the replay sampling rate output 23 outputting replay sampling rates based on replay output from said controller 15 to the replay unit 14, the audio-source output display part 12 displaying sampling rates of said sampling rate output 21, and the replay output display part 13 displaying sampling rates of said replay sampling rate output 23.

Moreover, the file format output 20 outputting file data of audio source data of the audio-source file 18 and the device data output 22 outputting device data of the device data memory 16 are equipped and file format names of said file format output 20 are displayed at the file name display part 24 of the audio-source output display part 12 and device data of said device data output 22 are displayed at the replay device name display part 27 of the replay output display part 13.

The audio-source output display part 12 comprise the numerical value display part 25 displaying by numerical values from the sampling rate output 21 and the bar-graph display part 26 displaying by bar graphs. The replay output display 13 comprises the numerical value display part 28 displaying by numerical values from the replay sampling rate output 23 and the bar-graph display part 29 displaying by bar graphs.

Embodiment 1

Figure 2:
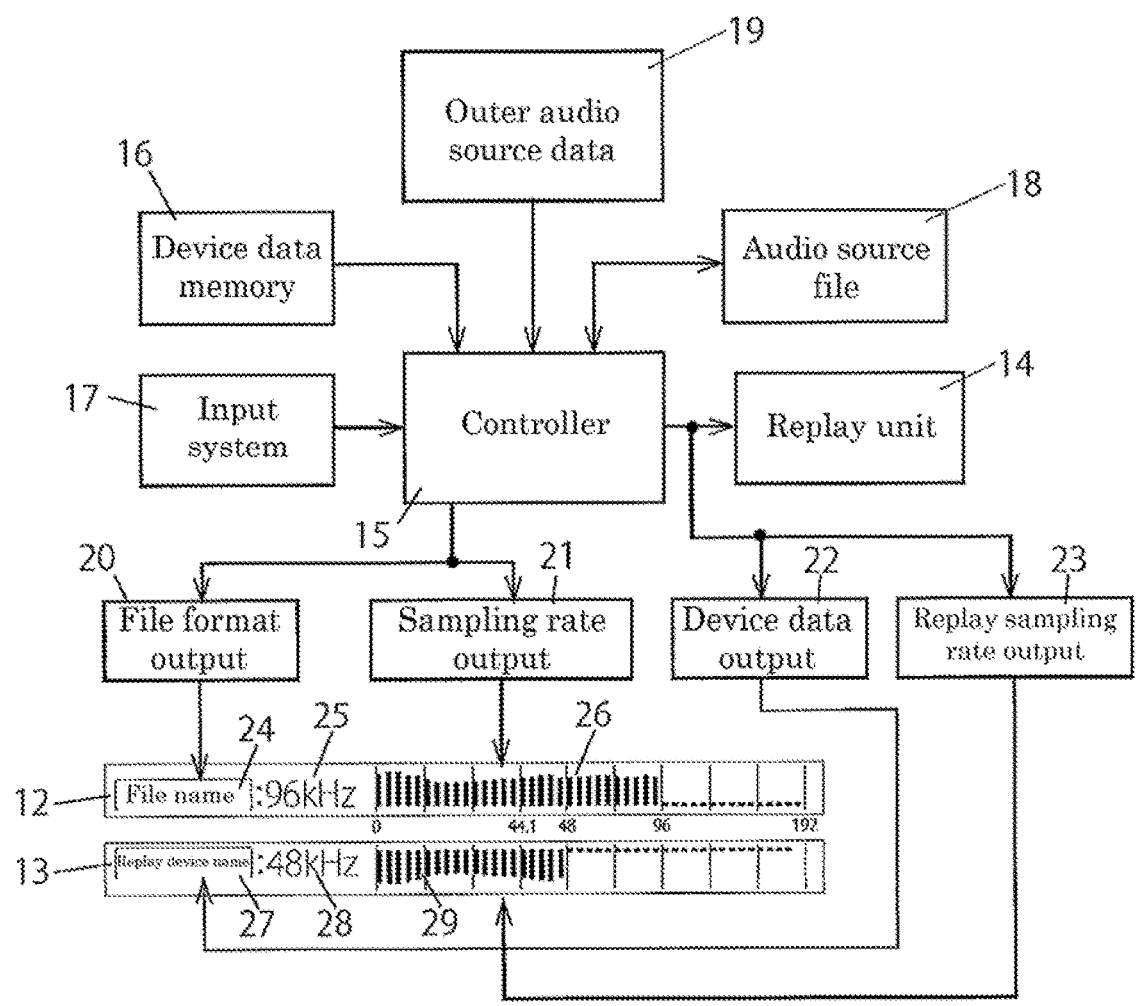
FIG. 2 is an inner circuit diagram.

Embodiment 1 of the display system of mobile audio devices in the present invention is explained, based on FIGS. 1 and 2.

In FIG. 1, 10 is a main body of a mobile audio device and in the main body of the mobile audio device 10, a display part 11 is equipped and the replay unit 14 such as earphone is connected. In said display part 11, the audio source output display part 12 and the replay output display part 13 which are specific for the present invention are equipped.

The controller 15 is mounted inside said main body of the mobile audio device 10 and the controller 15 is connected to the replay unit 14 comprising an earphone, the audio-source file 18 memorizing audio sources read from an outer audio-source data 19 and compressed, the device data memory 16 memorizing device data of the main body of the mobile audio device 10, and an input system 17 such as touch panel.

The output side of the replay unit of said controller 15 is connected to the file format output 20 outputting names of file formats memorized in the audio-source file 18 and the sampling rate output 21 analyzing sampling rates of compressed files memorized in the audio-source file 18 and outputting them. Those of 20 and 21 are then connected to said audio-source output display part 12.

At the output side of the replay 14 of said controller 15, the device data output 22 outputting device data from device data input from the device data memory 16 and replay sampling rate output 23 analyzing replay sampling of the main of the mobile audio device 10 used currently and outputting it are connected and then connected to the replay output display part 13.

Actions of such configuration are explained.

Outer audio-source data from the outer audio source data 19 such as internet, personal computer, and CD etc. are memorized at the audio source file 18 through the controller 15 by operating the input system 17 of the main body of the mobile audio device 10. The audio source file 18 memorizes outer audio source data in compressed conditions with high sound quality at sampling rates of high frequencies such as 192 kHz and 96 kHz or in non-compressed conditions or at other sampling rates of lower frequencies. Those are mixed in the memory.

When audio sources memorized at the audio source file 18 are taken in the file format output 20 and the sampling rate output 21 by operating the input system through the controller 15, in the file format output 20, [compressed file names] are output and displayed at the file name display part 24 of the audio source output display part 12. In the sampling rate output 21, frequencies of audio sources from the audio source file 18 are analyzed, converted to sampling rates and "96 kHz" is digital-displayed as a numerical data and bar graphs with fine intervals of 0-96 kHz are analogue-displayed to be recognizable at first glance.

As for replay data output at the replay unit 14 from the controller 15, names of devices of the main body of mobile audio device 10 are output and displayed at the replay device name display part 27 of the replay output display part 13. At the same time, sampling rates at the replay are output, based on frequency data in the main body of mobile audio device 10 and "48 kHz" as a numerical data is digital-displayed and bar graphs with fine intervals of 0-48 kHz are analogue-displayed to be recognizable at first glance.

Despite 96 kHz for audio-source data memorized at the audio source file 18, such displays enable to become recognizable at first glance that the replay is made with 48 kHz. In addition, when the displays of the audio-source output display part 12 and the replay output display part 13 are identical, it is understandable that the main body 10 of the mobile audio device replays as making sufficient use of the audio source.

In said embodiment, names of replay devices are displayed at the replay device name display part 27 of the replay output display part 13 by output from the device data output 22. However, when data of replay device names are absent or aren't discriminant, "OTHERS" is displayed, this including replay device names.

In said embodiment, as shown in FIG. 1, the replay unit 14 is connected externally to the main body of the mobile audio device 10 by lead wires. The replay unit 14 includes items set inside the main body of the mobile audio device 10.

In said embodiment, the audio-source output display part 12 and the replay output display part 13 are arranged with one each. For instance, in case that LR signal is present, the audio-source output display part 12 and the replay output display part 13 are arranged with two or more each.

EXPLANATIONS OF LETTERS OR NUMERICAL

10: a main body of a mobile audio device, 11: a display part, 12: an audio-source output display part, 13: a replay output display part, 14: a replay unit, 15: a controller, 16: a device data memory, 17: an input system, 18: an audio-source file, 19: an outer audio-source data, 20: a file format output, 21: a sampling rate output, 22: a device data output, 23: a replay sampling rate output, 24: a file name display part, 25: a numerical value display part, 26: a bar graph display part, 27: a replay device name display part, 28: a numerical value display part, 29: a bar graph display part

What is claimed is:

1. A display system of mobile audio devices, comprising:
    an audio-source file reading external multiple audio data and memorizing said external multiple audio data;
    a replay unit replaying audio-source data of said audio source file;
    a device data memory memorizing a device name of a replay device;
    a controller controlling readings and inputs of said audio source data and readings and inputs of said device name of said replay device;
    a sampling rate output outputting a source sampling rate memorized in said audio-source data of said audio-source file;
    a replay sampling rate output outputting a replay sampling rate output from a currently used replay unit;
    an audio-source output display part displaying said source sampling rate; and
    a replay output display part displaying said replay sampling rate, wherein
    said audio-source output display part and said replay output display part are both simultaneously displaying along with a file format output which outputting a file format name of said audio-source data and a device data output outputting said device name of said currently used replay device,
    said audio-source output display part includes a file-name display part displaying said file format name of said audio-source data, a first numerical value display part displaying digitally said source sampling rate of said audio-source data by numerical values, and a first bar-graph display part analog-displaying said source sampling rate of said audio-source data by bar graphs,
    said replay output display part includes a replay device name display part displaying said device name of said currently used replay device, a second numerical value display part digital-displaying said replay sampling rate of said currently used replay device by numerical values, and a second bar graph display part analogue-displaying said replay sampling rate of said currently used replay device by bar graphs,
    said file name display part and said replay device name display part are arranged up and down each other for comparative display,
    said first numerical value display part and said second numerical value display part are arranged up and down each other for comparative display,
    said first bar graph display part and said second bar graph display part are arranged up and down each other for comparative display, and
    said replay device name displaying "OTHERS" when output of replay device name from said device data output is not memorized with said device data memory.

* * * * *